(12) United States Patent
Jao et al.

(10) Patent No.: US 12,332,537 B2
(45) Date of Patent: Jun. 17, 2025

(54) ELECTRONIC DEVICE

(71) Applicant: Innolux Corporation, Miaoli County (TW)

(72) Inventors: Mei-Wen Jao, Miaoli County (TW); Chang-Chiang Cheng, Miaoli County (TW); Yung-Hsun Wu, Miaoli County (TW); Rui-An Yu, Miaoli County (TW); Yi-Hsin Lin, Hsinchu (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/735,196

(22) Filed: Jun. 6, 2024

(65) Prior Publication Data

US 2024/0319560 A1 Sep. 26, 2024

Related U.S. Application Data

(63) Continuation of application No. 17/890,282, filed on Aug. 18, 2022, now abandoned.

(51) Int. Cl.
*G02F 1/29* (2006.01)
*G02C 7/08* (2006.01)

(52) U.S. Cl.
CPC ............ *G02F 1/294* (2021.01); *G02C 7/083* (2013.01); *G02F 2201/44* (2013.01)

(58) Field of Classification Search
CPC ...................................................... G02F 1/294
See application file for complete search history.

(56) References Cited

U.S. PATENT DOCUMENTS

| 10,802,374 | B1* | 10/2020 | Wang .................. G02F 1/29 |
| 2017/0323615 | A1 | 11/2017 | Hazra et al. |
| 2020/0209668 | A1* | 7/2020 | Tsuda ................ G02F 1/133308 |
| 2021/0247627 | A1 | 8/2021 | Lee |
| 2022/0026742 | A1 | 1/2022 | Gill et al. |

FOREIGN PATENT DOCUMENTS

TW        I709790        11/2020

OTHER PUBLICATIONS

"Office Action of Taiwan Counterpart Application", issued on Mar. 28, 2025, p. 1-p. 10.

* cited by examiner

*Primary Examiner* — Edmond C Lau
(74) *Attorney, Agent, or Firm* — JCIPRNET

(57) ABSTRACT

An operation method of electronic device, comprising providing a first panel, wherein the first panel comprises first substrate, first medium layer disposed on the first substrate, a first electrode layer disposed between the first substrate and the first medium layer, and a second electrode layer disposed between the first electrode layer and the first medium layer; providing a second panel overlapped with the first panel, providing an adhesive layer, wherein the first panel is attached to the second panel through the adhesive layer, and the first panel and the second panel present a mirror-symmetrical structure with the adhesive layer as the axis of symmetry; applying a first voltage to the first electrode layer; applying a second voltage to the second electrode layer; applying a third voltage to the first electrode layer.

17 Claims, 13 Drawing Sheets

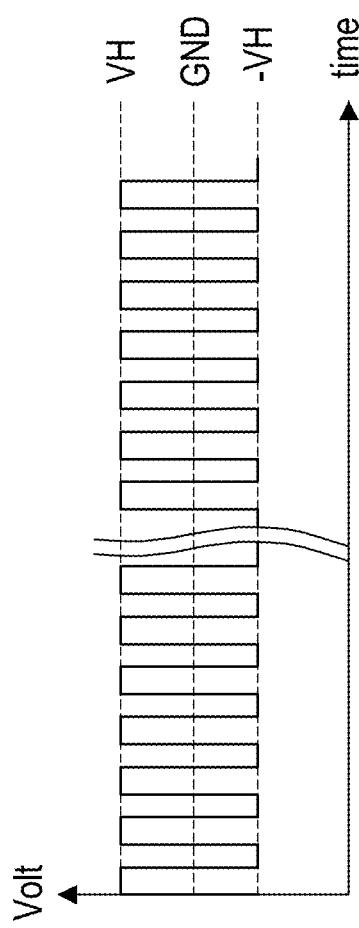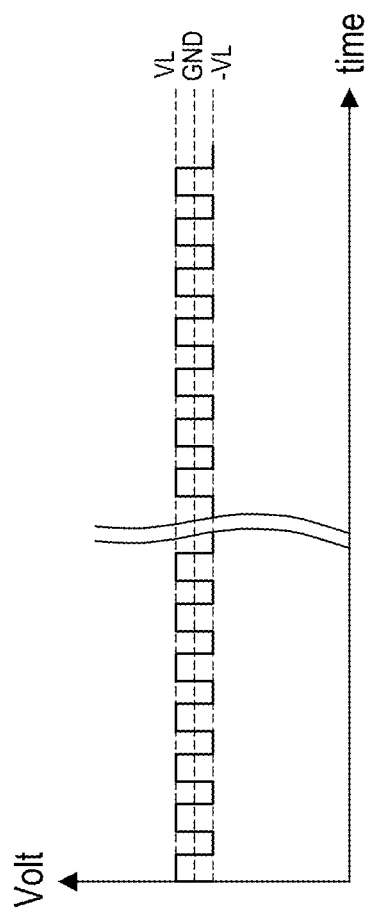

ELECTRONIC DEVICE

CROSS-REFERENCE TO RELATED APPLICATION

This application is a continuation application of and claims the priority benefit of U.S. application Ser. No. 17/890,282, filed on Aug. 18, 2022. The entirety of the above-mentioned patent application is hereby incorporated by reference herein and made a part of this specification.

BACKGROUND

Technical Field

The disclosure relates to an electronic device.

Description of Related Art

Traditional progressive lens (also called multifocal lens) is characterized by having a gradual change in lens power (or diopter) from region to region across the lens, allowing the wearer of the glasses to meet the visual needs of various distances in daily life without needing to change glasses. However, since different distances require using different regions of the glasses to see, it takes a while for the wearer to get used to it. While some new technologies for smart glasses which use touch sensors to change the focal distance of glasses have been proposed, many problems are still needed to be improved, such as the apparent visibility of the Fresnel lens structure or the inability to adjust the lens power according to the actual situation.

SUMMARY

The disclosure provides an electronic device, which may help to improve at least one of the existing problems.

According to an embodiment of the disclosure, an electronic device includes a first panel and a second panel overlapped with the first panel. The first panel includes a substrate, a first medium layer, a first electrode layer and a second electrode layer. The first medium layer is disposed on the substrate. The first electrode layer is disposed between the substrate and the first medium layer. The second electrode layer is disposed between the first electrode layer and the first medium layer. A first voltage is applied to the first electrode layer, a second voltage is applied to the second electrode layer, and the first voltage is different from the second voltage.

According to another embodiment of the disclosure, an electronic device includes a first panel and a polarizer overlapped with the first panel. The first panel includes a substrate, a first medium layer, a first electrode layer and a second electrode layer. The first medium layer is disposed on the substrate. The first electrode layer is disposed between the substrate and the first medium layer. The second electrode layer is disposed between the first electrode layer and the first medium layer. A first voltage is applied to the first electrode layer, a second voltage is applied to the second electrode layer, and the first voltage is different from the second voltage.

In order to make the above-mentioned features and advantages of the disclosure comprehensible, embodiments accompanied with drawings are described in detail below.

BRIEF DESCRIPTION OF THE DRAWING

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 9A and FIG. 10A are schematic views of signals applied to the first electrode layer in FIG. 4A through FIG. 8C.

FIG. 9B and FIG. 10B are schematic views of signals applied to the second electrode layer in FIG. 4A through FIG. 8C.

DETAILED DESCRIPTION OF DISCLOSED EMBODIMENTS

Figure 1:
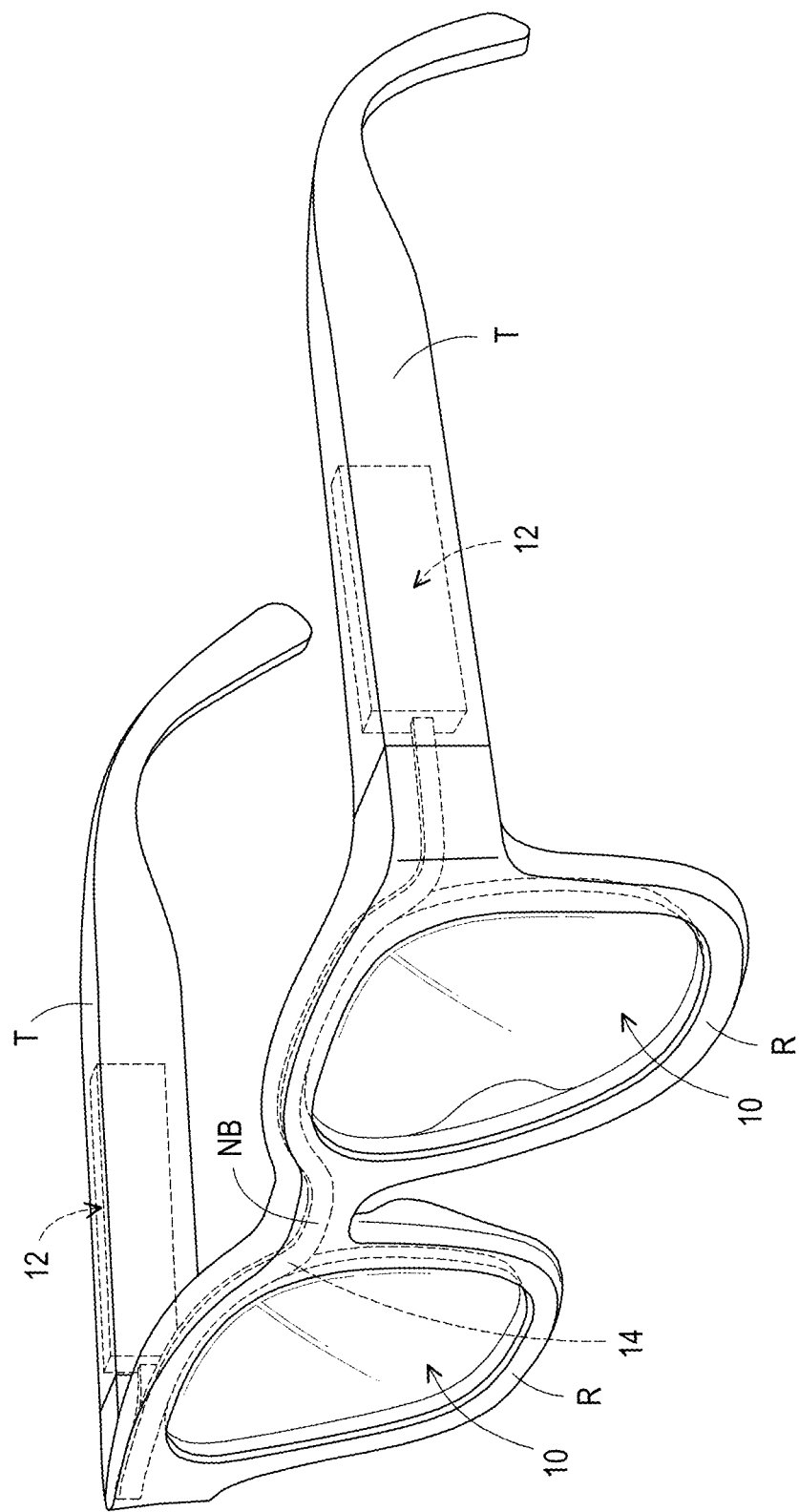
FIG. 1 is a schematic view of an electronic device according to an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

Certain terms may be used throughout the disclosure and the appended patent claims to refer to specific elements. It should be understood by those of ordinary skill in the art that electronic device manufacturers may refer to the same element by different names. The disclosure does not intend to distinguish between elements that have the same function but have different names. In the following description and patent claims, words such as "comprising" and "including" are open-ended words, so they should be interpreted as meaning "including but not limited to . . . ".

In the disclosure, wordings used to indicate directions, such as "up," "down," "front," "back," "left," and "right," merely refer to directions in the accompanying drawings. Therefore, the directional wordings are used to illustrate rather than limit the disclosure. In the accompanying drawings, the drawings illustrate the general features of the methods, structures, and/or materials used in the particular embodiments. However, the drawings shall not be interpreted as defining or limiting the scope or nature covered by the embodiments. For example, the relative sizes, thicknesses, and locations of the layers, regions, and/or structures may be reduced or enlarged for clarity.

A structure (or layer, element, substrate) described in this disclosure is located on/above another structure (or layer, element, substrate), may indicate that the two structures are adjacent and directly connected, or may indicate that the two structures are adjacent but not directly connected. Indirect connection means that there is at least one intermediate structure (or intermediate layer, intermediate element, intermediate substrate, intermediate spacer) between the two structures, the lower surface of one structure is adjacent to or directly connected to the upper surface of the intermediate structure, and the upper surface of another structure is adjacent to or directly connected to the lower surface of the intermediate structure. The intermediate structure may be composed of a single-layer or multi-layer physical structure or a non-physical structure, which is not limited thereto. In the disclosure, when a certain structure is disposed "on" other structures, it may mean that a certain structure is "directly" on other structures, or it means that a certain structure is "indirectly" on other structures, that is, at least one structure is sandwiched between a certain structure and other structures.

The terms such as "first", "second", etc. used in the description and the patent claims are used to modify elements, which do not imply and represent that the (or these) elements have any previous ordinal numbers, and also does not represent the order of a certain element and another element, or the order of the manufacturing method. The use of these ordinal numbers is to only clearly distinguish an element with a certain name from another element with the same name. The same terms may not be used in the patent claims and the description, and accordingly, the first component in the description may be the second component in the patent claims.

The coupling described in the disclosure may refer to direct electrical connection or indirect electrical connection. In the case of a direct electrical connection, the end points of two elements on a circuit directly connect to each other, or connect to each other through a conductive wire. In the case of indirect electrical connection, a switch, a diode, a capacitor, an inductor, a resistor, other suitable elements, or a combination thereof, but not limited therein, is between the end points of two elements on a circuit.

In the disclosure, the thickness, length, and width may be measured by adopting a measurement method such as an optical microscope (OM), and the thickness or width may be measured from a cross-sectional image in an electronic microscope, but not limited thereto. In addition, any two values or directions used for comparison may have certain errors. In addition, the terms "about", "equal to", "equal" or "same", "substantially" or "generally" are interpreted as within 20% of a given value or range, or interpreted as within 10%, 5%, 3%, 2%, 1%, or 0.5% of the given value or range. Furthermore, the terms "a given range is from a first value to a second value", "a given range is within a range from the first value to the second value" means that the given range includes the first value, the second value, and other values in between. If a first direction is perpendicular to a second direction, an angle between the first direction and the second direction may be between 80 degrees and 100 degrees; if the first direction is parallel to the second direction, an angle between the first direction and the second direction may be between 0 degrees and 10 degrees.

It should be noted that, in the following embodiments, the features in several different embodiments may be replaced, reorganized, and mixed to complete other embodiments without departing from the spirit of the disclosure. As long as the features of the various embodiments do not violate the spirit of the disclosure or conflict with one another, they may be mixed and matched arbitrarily.

Unless otherwise defined, all terms (including technical and scientific terms) used herein have the same meaning as commonly understood by one of ordinary skill in the art to which this disclosure belongs. It is understood that these terms, such as those defined in commonly used dictionaries, should be interpreted as having meanings consistent with the relevant art and the background or context of the disclosure, and should not be interpreted in an idealized or overly formal manner, unless otherwise defined in the embodiments of the disclosure.

In the disclosure, an electronic device may include a vision correction device, a display device, a backlight device, an antenna device, a sensing/detecting device, or a tiled device, but is not limited thereto. The electronic device may be a bendable or flexible electronic device. The vision correction device may be a device with variable focal distance to achieve myopia correction, presbyopia correction, amblyopia correction and/or astigmatism correction, but is not limited thereto. The display device may be a non-self-luminous display device or a self-luminous display device. The antenna device may be a liquid crystal antenna device or a non-liquid crystal antenna device, and the sensing/detecting device may be a device for sensing capacitance, light, heat or ultrasonic waves, but not limited thereto. In the disclosure, an electronic device may include electronic elements, and the electronic elements may include passive elements and active elements, such as a capacitor, a resistor, an inductor, a diode, a transistor, and the like. The diode may include a light emitting diode or a photodiode. The light emitting diode may include, for example, an organic light emitting diode (OLED), a mini light emitting diode (mini LED), a micro light emitting diode (micro LED), or a quantum dot light emitting diode (quantum dot LED), but not limited thereto. The tiled device may be, for example, a tiled display device or a tiled antenna device, but not limited thereto. It should be noted that, the electronic device may be any arrangement and combination of the foregoing, but not limited thereto. In addition, the shape of the electronic device may be rectangular, circular, polygonal, a shape with curved edges, or other suitable shapes. The electronic device may have a peripheral system such as a driving system, a control system, a light source system, and the like to support a display device, an antenna device, a wearable device (e.g., including augmented reality or virtual reality), an in-vehicle device (e.g., including car windshields), or a tiled device. Hereinafter, the vision correction device is used as the electronic device to illustrate the disclosure, but the disclosure is not limited thereto.

Figure 2:
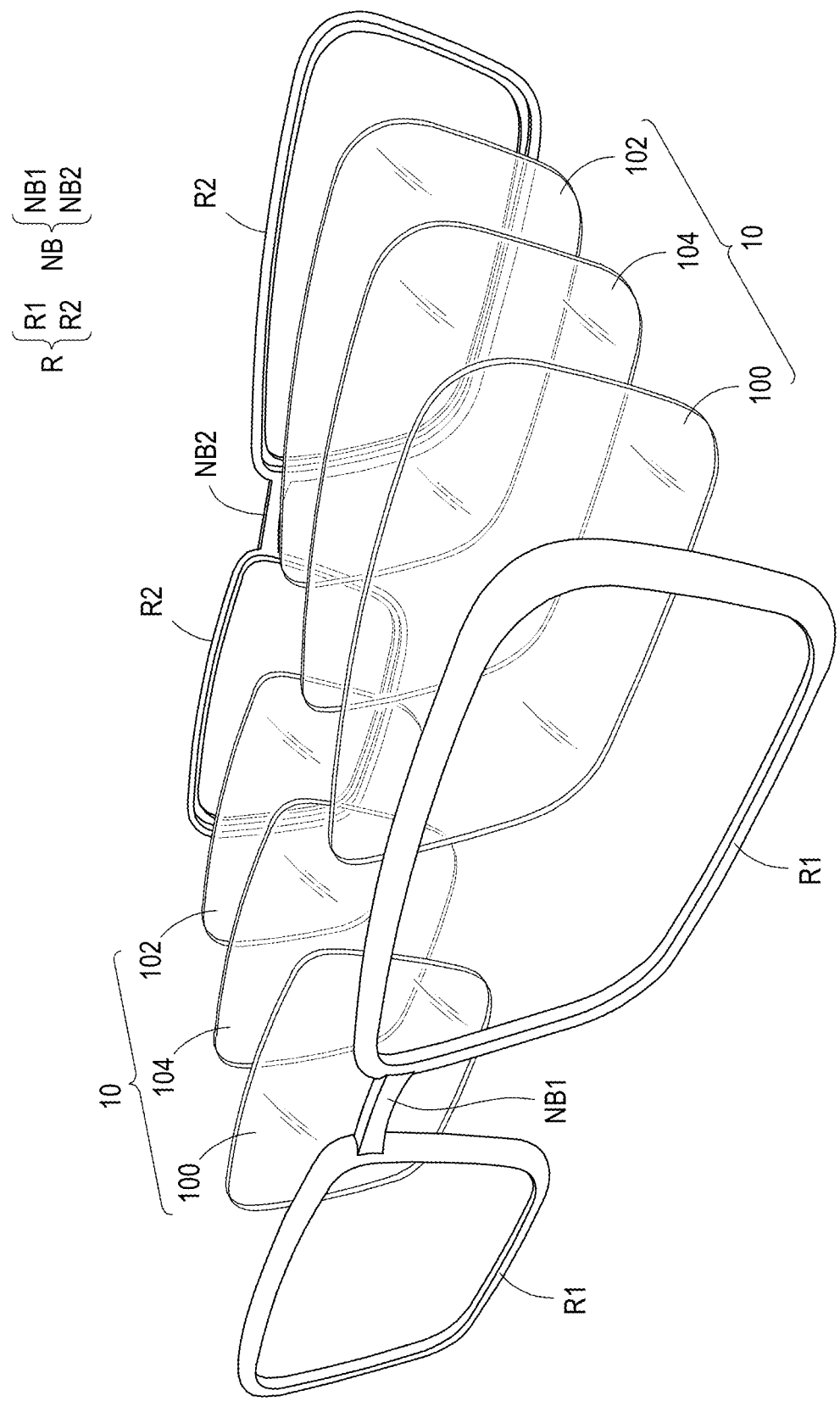
FIG. 2 is an exploded schematic view of the rims, optical adjustment structures and a nose bridge in FIG. 1.
Figure 3A:
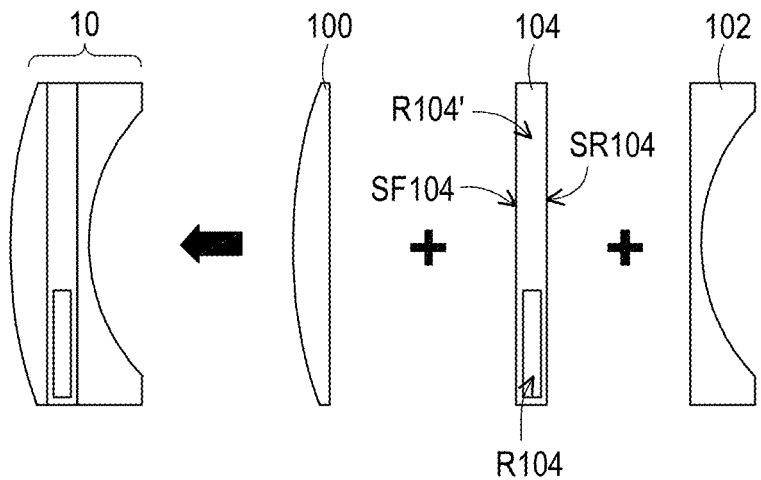
FIG. 3A through FIG. 3C are schematic views of the optical adjustment structures in FIG. 2.
Figure 3B:
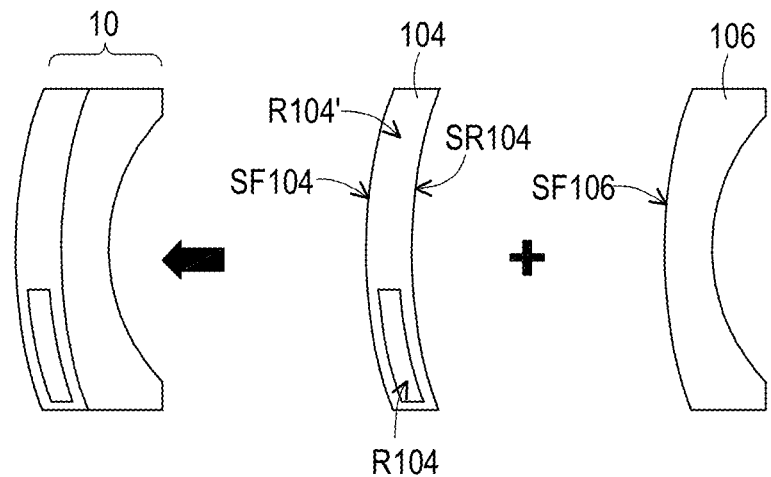
Figure 3C:
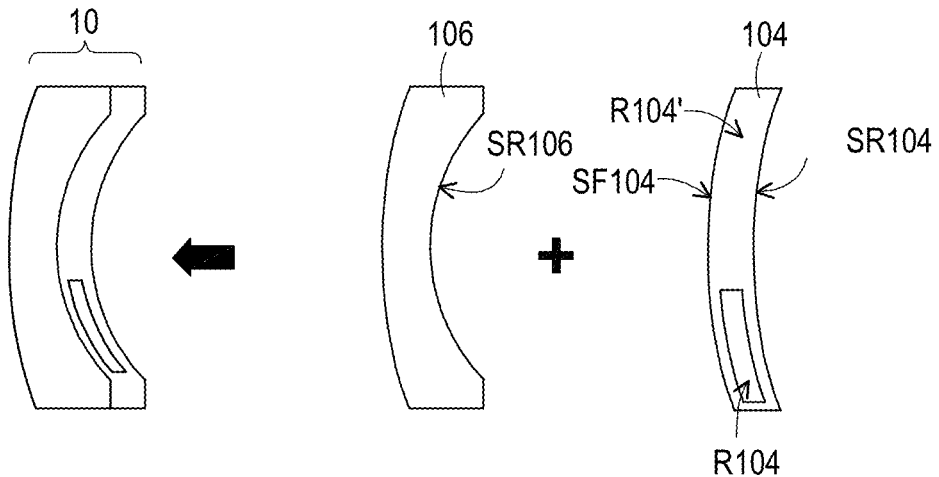
Figure 4B:
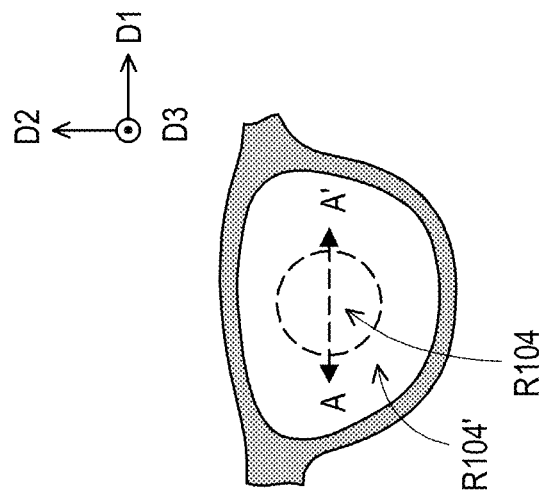
FIG. 4A through FIG. 8C, FIG. 11 and FIG. 12 are schematic views of electronic devices according to various embodiments of the disclosure.
Figure 4A:
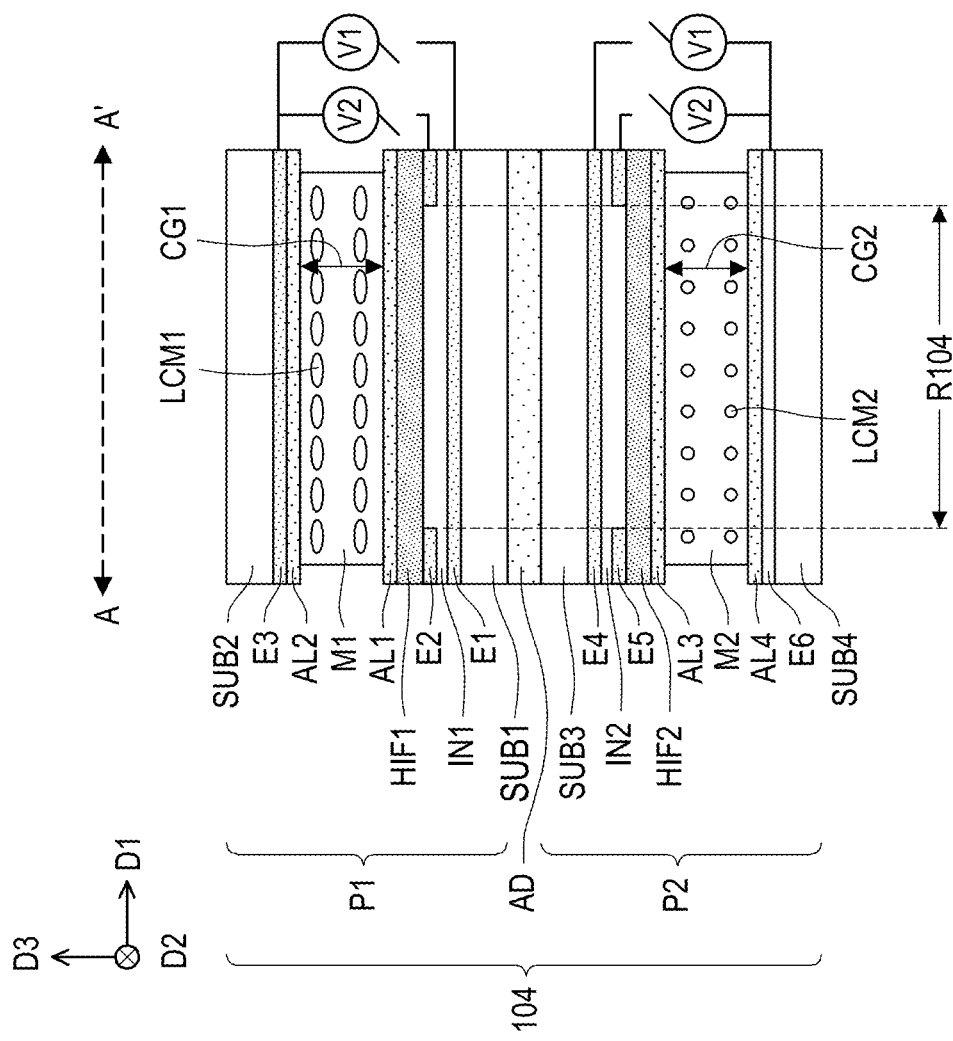
Figure 5B:
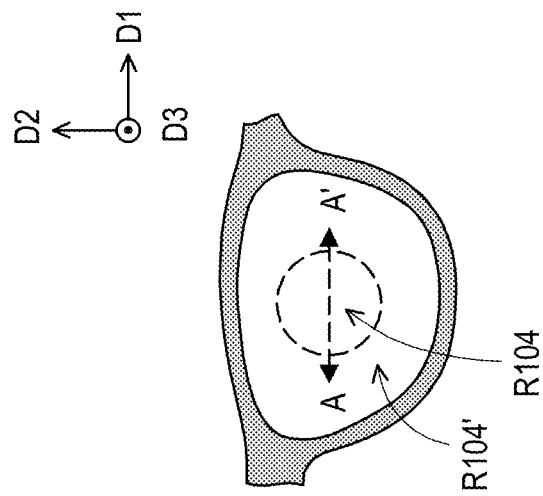
Figure 5A:
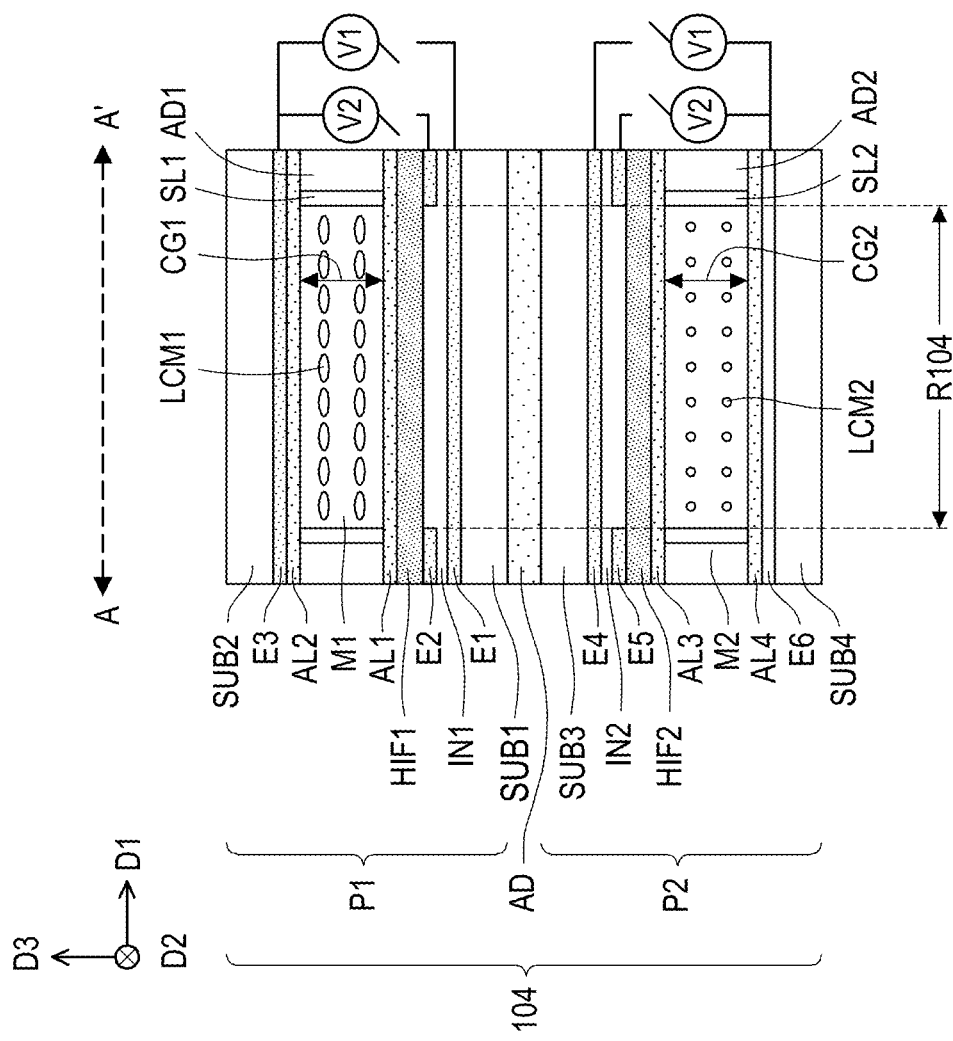
Figure 10A:
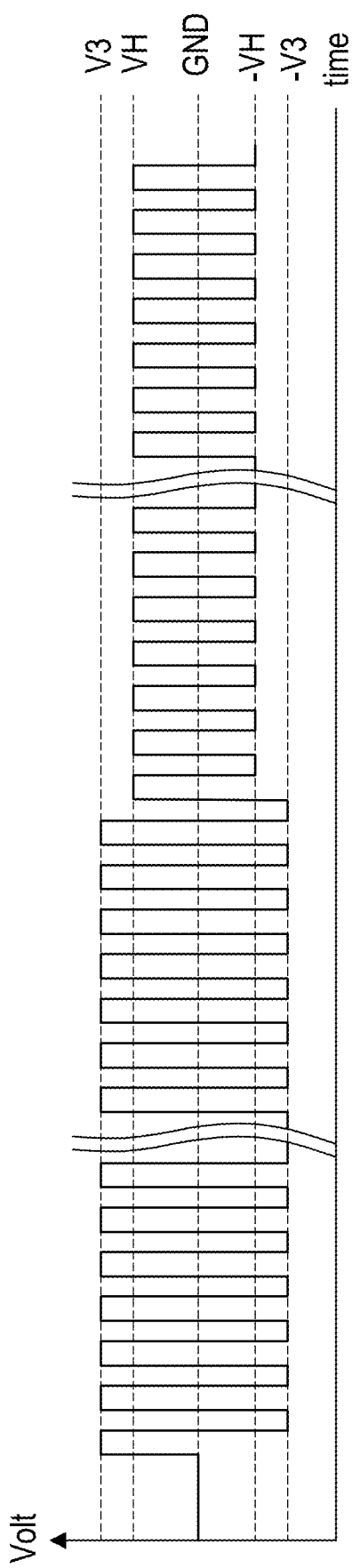
Figure 10B:
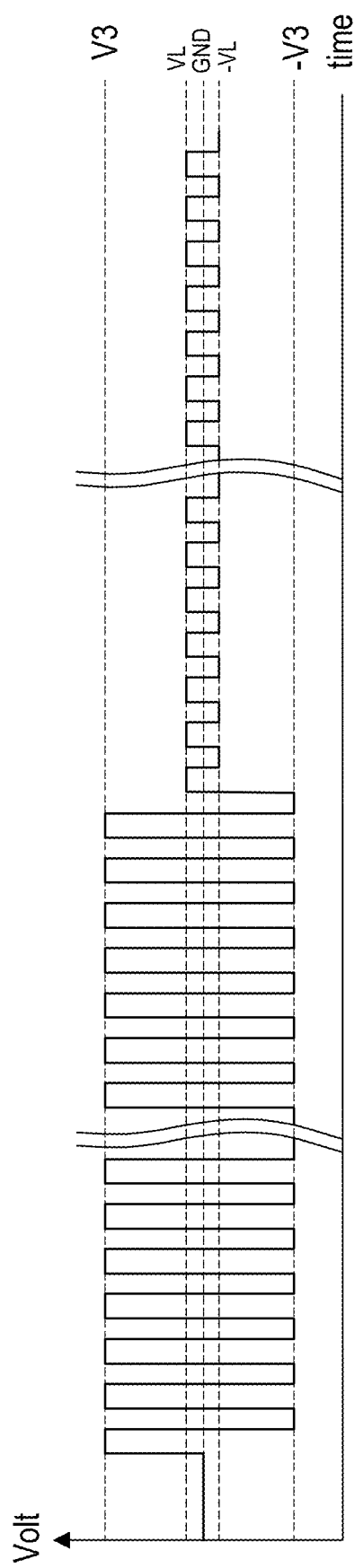

FIG. 1 is a schematic view of an electronic device according to an embodiment of the disclosure. FIG. 2 is an exploded schematic view of the rims, optical adjustment structures and a nose bridge in FIG. 1. FIG. 3A through FIG. 3C are schematic views of the optical adjustment structures in FIG. 2. FIG. 4A through FIG. 8C, FIG. 11 and FIG. 12 are schematic views of electronic devices according to various embodiments of the disclosure, wherein FIG. 4A and FIG. 5A are cross-sectional views respectively corresponding to the line A-A' in FIG. 4B and FIG. 5B. FIG. 9A and FIG. 10A are schematic views of signals applied to the first electrode layer in FIG. 4A through FIG. 8C. FIG. 9B and FIG. 10B are schematic views of signals applied to the second electrode layer in FIG. 4A through FIG. 8C. In the embodiments shown in FIG. 1 through FIG. 10B, the technical solutions provided by the different embodiments hereinafter may be replaced, combined, or mixed with one another, so as to constitute another embodiment without violating the spirit of the disclosure.

Referring to FIG. 1, an electronic device 1 may be glasses for vision correction. Vision correction may include myopia, presbyopia and/or astigmatism correction, but not limited thereto. The electronic device 1 may include optical adjustment structures 10 respectively mounted in rims R of the glasses to perform vision correction for the wearer of the glasses. In some embodiments, the optical adjustment structures 10 may have electrically controllable focal distances, and the electronic device 1 further includes at least one circuit module 12 disposed in at least one of the two temples T of the glasses to provide power and drive functions. The electronic device 1 may also include at least one signal connection element 14 disposed in the glasses (e.g., in the nose bridge NB of the glasses, in the temple T of the glasses, and/or in the any part of the glasses) to electrically connect the optical adjustment structures 10 with the at least one controller 12 for signal and/or power transmission.

In some embodiments, as shown in FIG. 2, the rims R include front rims R1 and rear rims R2, and the nose bridge NB includes a front nose bridge NB1 connected between the front rims R1 and a rear bridge NB2 connected between the rear rims R2. However, the construction of the rims R and/or the nose bridge NB may be adjusted according to actual needs. In the disclosure, the rear side of an object refers to the side of the object that faces the wearer of the glasses, and the front side of the object refers to the side of the object opposite to the rear side.

Each of the optical adjustment structure 10 may include a panel assembly 104, but not limit thereto. In another embodiment, each of the optical adjustment structure 10 may include at least one lens (e.g., a front lens 100 and a rear lens 102) and a panel assembly 104 connected to the at least one lens, but not limit thereto. In FIG. 2, two lenses (e.g., the front lens 100 and the rear lens 102) respectively located at opposite sides (e.g., front side and rear side) of the panel assembly 104 are illustrated for exemplary explanation purpose. However, the number of the lenses in each of the optical adjustment structure 10 and/or arrangement of the lens/lenses and the panel assembly 104 may be changed according to needs. In addition, the panel assembly 104 may be attached to the at least one lens through an adhesive layer (not shown) or other fixing mechanisms (not shown). The material of the adhesive layer may include optically clear adhesive (OCA), optically clear resin (OCR), double-sided tape, liquid optically clear adhesive (LOCA) or other light-transmitting materials having viscosity. In some embodiments, the optical adjustment structure 10 may be served as lens of the glasses.

In some embodiments, as shown in FIG. 3A, the front lens 100 and the rear lens 102 are respectively a plano-concave lens and a plano-convex lens, and the panel assembly 104 is disposed between the plano-concave lens and the plano-convex lens. The panel assembly 104 may have an optical adjustable region R104, wherein the focal distance of the optical adjustable region R104 may be electrically controllable. In other words, the focal distance of the optical adjustable region R104 may be changed by an electrically controlled manner. The panel assembly 104 may also have a region R104' outside the optical adjustable region R104, and the diopter of the region R104' may be fixed.

Specifically, the overall diopter of the region R104' depends mainly on the front surface SF104 and the rear surface SR104 of the panel assembly 104. When both of the front surface SF104 and the rear surface SR104 of the panel assembly 104 are flat (i.e., have infinite radii of curvature), the region R104' is not used to change the traveling path of light. Similarly, the overall diopter of the optical adjustable region R104 not only depends on the electrically controlled focal distance but also depends on the front surface SF104 and the rear surface SR104 of the panel assembly 104. When both of the front surface SF104 and the rear surface SR104 of the panel assembly 104 are flat, the overall diopter of the optical adjustable region R104 is determined by the electrically controlled focal distance.

Therefore, when the panel assembly 104 is not driven, both of the optical adjustable region R104 and the region R104' let the light pass through without converging or diverging the light, and thus the effective focal distance of the optical adjustment structure 10 (corresponding to both of the optical adjustable region R104 and the region R104') depends mainly on the front lens 100 and the rear lens 102. On the other hand, when the panel assembly 104 is driven, the focal distance of the optical adjustable region R104 is changed, and the traveling path of the light passing through the optical adjustable region R104 changes accordingly; in this case, the effective focal length of the optical adjustment structure 10 corresponding to the optical adjustable region R104 depends on the panel assembly 104 in addition to the front lens 100 and the rear lens 102, while the effective focal length of the optical adjustment structure 10 corresponding to the region R104' remains depending mainly on the front lens 100 and the rear lens 102.

For example, when the panel assembly 104 is not driven, the optical adjustment structure 10 may be used to correct myopia, and when the panel assembly 104 is driven, the optical adjustment structure 10 may be used to correct presbyopia, and in this case, the optical adjustable region R104 may be located on the lower region of the optical adjustment structure 10. However, the position/location of the optical adjustable region R104 in the optical adjustment structure 10 and/or the application of the optical adjustment structure 10 can be changed according to actual needs.

In some embodiments, as shown in FIG. 3B (or FIG. 3C), the optical adjustment structure 10 includes one lens (e.g., a lens 106) and the panel assembly 104 connected to the lens 106. The lens 106 may be a plano-convex lens, a plano-concave lens, a convex-concave lens, a meniscus lens, a biconvex lens, a biconcave lens or other surface lenses, which may be determined according to practical applications. The panel assembly 104 may be a bendable or flexible lens-form structure attached to a front surface SF of the lens 106 (as shown in FIG. 3B) or a rear surface SR of the lens 106 (as shown in FIG. 3C). When both of the front surface SF104 and the rear surface SR104 of the panel assembly 104 are surfaces with finite radii of curvature, the effective focal length of the optical adjustment structure 10 further depends on the diopter of the panel assembly 104 when the panel assembly 104 is driven or not driven. In some embodiments, the optical adjustment structure 10 includes a panel assembly 104, but not limited thereto.

In some embodiments, as shown in FIG. 4A, the panel assembly 104 may include two panels (e.g., a first panel P1 and a second panel P2) and an adhesive layer AD, wherein the first panel P1 is attached to the second panel P2 through the adhesive layer AD. The material of the adhesive layer AD may include optically clear adhesive (OCA), optically clear resin (OCR), double-sided tape, liquid optically clear adhesive (LOCA) or other light-transmitting materials having viscosity. However, the number of the panels in the panel assembly 104 and the fixing manner of the panels are not limited thereto.

Each of the panels (e.g., the first panel P1 and the second panel P2) in the panel assembly 104 is configured to change the diopter of the panel assembly 104. In some embodiments, each of the panels (e.g., the first panel P1 and the second panel P2) is an electronically controlled panel.

For example, the first panel P1 includes a substrate SUB1, a first medium layer M1, a first electrode layer E1 and a second electrode layer E2, but not limited thereto. In some embodiments, as shown in FIG. 4A, the first panel P1 further includes an insulating layer IN1, an alignment film AL1, a high-impedance film HIF1, a substrate SUB2, a third electrode layer E3 and an alignment film AL2, but also not limited thereto. One or more elements or layers may be added to or omitted from the first panel P1 according to actual needs.

The substrate SUB1 may be a rigid substrate or a flexible substrate. The material of the substrate SUB1 may include glass, quartz, ceramic, sapphire, polycarbonate (PC), polyimide (PI), polypropylene (PP), polyethylene terephthalate (PET), other suitable materials, or a combination of the foregoing materials, but not limited thereto.

The first medium layer M1 is disposed on the substrate SUB1. For example, the first medium layer M1 is disposed between the alignment film AL1 and the alignment film AL2. In some embodiments, the first medium layer M1 is a liquid crystal layer including first liquid crystal molecules LCM1, but not limited thereto. The first liquid crystal molecules LCM1 are tilted according to the rubbing direction (not shown) of the alignment film AL1 and the alignment film AL2 when no voltage is applied to the first panel P1. In the embodiment shown in FIG. 4A, the rubbing direction of the alignment film AL1 and the alignment film AL2 is along direction D1, and the first medium layer M1 includes the first liquid crystal molecules LCM1 with a first alignment direction (e.g., direction D1); however, the rubbing direction of the alignment film AL1 and the alignment film AL2 may be changed according to needs.

The first electrode layer E1 is disposed between the substrate SUB1 and the first medium layer M1. For example, the first electrode layer E1 is disposed on the substrate SUB1. The first electrode layer E1 may be a non-patterned transparent conductive layer. Transparent conductive material may include metal oxide (e.g., indium tin oxide), carbon nanotube, graphene, other suitable materials, or a combination thereof, but not limited to.

The insulating layer IN1 is disposed on the first electrode layer E1 and is configured to electrically isolated the first electrode layer E1 from the second electrode layer E2. The material of the insulating layer IN1 may include inorganic insulating material, organic insulating material or a combination thereof, but not limited thereto.

The second electrode layer E2 is disposed between the first electrode layer E1 and the first medium layer M1. For example, the second electrode layer E2 is disposed on the insulating layer IN1. The second electrode layer E2 may be a patterned transparent conductive layer. Transparent conductive material may include metal oxide (e.g., indium tin oxide), carbon nanotube, graphene, other suitable materials, or a combination thereof, but not limited to. As shown in FIG. 4A and FIG. 4B, the edge (see the dash line in FIG. 4B) of the optical adjustable region R104 may be defined by the inner edge of the second electrode layer E2.

The alignment film AL1 is disposed between the second electrode layer E2 and the first medium layer M1. For example, the alignment film AL1 is disposed on the high-impedance film HIF1. The material of the alignment film AL1 may include polymer, but not limited thereto.

The high-impedance film HIF1 is disposed between the alignment film AL1 and the second electrode layer E2. For example, the high-impedance film HIF1 is disposed on the insulating layer IN1 and the second electrode layer E2. The high-impedance film HIF1 may be a non-patterned conductive layer with a high surface impedance. For example, a surface impedance of the high-impedance film HIF1 is $10^5 \Omega/\square$ to $10^{10} \Omega/\square$, but not limited thereto. The material of the high-impedance film HIF1 may include conductive polymer, transparent conductive oxide, metal, carbon nanotube, graphene, or a combination thereof, and the high-impedance film HIF1 may be disposed on the insulating layer IN1 and the second electrode layer E2 through coating, but not limited thereto.

The substrate SUB2 is opposite to the substrate SUB1. In other words, the substrate SUB2 is overlapped with the substrate SUB1 along a thickness direction (e.g., direction D3) of the first panel P1. The substrate SUB2 may also be a rigid substrate or a flexible substrate. Material of the substrate SUB2 may refer to the material of the substrate SUB1, which will not be repeated here.

The third electrode layer E3 is disposed on the substrate SUB2 and is disposed between the first medium layer M1 and the substrate SUB2. The third electrode layer E3 may be a non-patterned transparent conductive layer. Transparent conductive material may include metal oxide (e.g., indium tin oxide), carbon nanotube, graphene, other suitable materials, or a combination thereof, but not limited to.

The alignment film AL2 is disposed on the third electrode layer E3 and is disposed between the first medium layer M1 and the third electrode layer E3. The material of the alignment film AL2 may include polymer, but not limited thereto.

The second panel P2 may have a similar structure to the first panel P1. For example, the second panel P2 may include a substrate SUB3, a second medium layer M2, a fourth electrode layer E4, a fifth electrode layer E5, an insulating layer IN2, an alignment film AL3, a high-impedance film HIF2, a substrate SUB4, a sixth electrode layer E6 and an alignment film AL4, but not limited thereto. One or more elements or layers may be added to or omitted from the second panel P2 according to actual needs. The material and/or the disposition relationship of the layers above may refer to the description of the substrate SUB1, the first medium layer M1, the first electrode layer E1, the second electrode layer E2, the insulating layer IN1, the alignment film AL1, the high-impedance film HIF1, the substrate SUB2, the third electrode layer E3 and the alignment film AL2, which will not be repeated here.

The main difference between the first panel P1 and the second panel P2 is that the second medium layer M2 includes second liquid crystal molecules LCM2 with a second alignment direction (e.g., direction D2) different from the first alignment direction (e.g., direction D1). Specifically, the second liquid crystal molecules LCM2 are tilted according to the rubbing direction (not shown) of the alignment film AL3 and the alignment film AL4 when no voltage is applied to the second panel P2. In the embodiment as shown in FIG. 4A, the rubbing direction of the alignment film AL3 and the alignment film AL4 is along direction D2, and the second medium layer M2 includes the second liquid crystal molecules LCM2 with the second alignment direction (e.g., direction D2); however, the rubbing direction of the alignment film AL3 and the alignment film AL4 may be changed according to needs.

In some embodiments, the first alignment direction (e.g., direction D1) is perpendicular to the second alignment direction (e.g., direction D2) to respectively control the diopters of the light waves whose polarization directions are perpendicular to each other, in this way, the electronic device can be polarizer-free, but not limited thereto.

When the diopter of the optical adjustable region R104 is to be adjusted, a first voltage V1 is applied to the first electrode layer E1, a second voltage V2 is applied to the second electrode layer E2, and the first voltage V1 is different from the second voltage V2. The first voltage V1 is the absolute of the voltage difference between the first electrode layer E1 and the third electrode layer E3, and the second voltage V2 is the absolute of the voltage difference between the second electrode layer E2 and the third electrode layer E3. The first voltage V1 may be larger or smaller than the second voltage V2. In FIG. 9A through FIG. 10B, high voltage VH served as the first voltage V1 and low voltage VL served as the second voltage V2 are illustrated for exemplary explanation purpose. However, in some embodiments, the second voltage V2 may be the high voltage VH, and the first voltage V1 may be the low voltage VL. As shown in FIG. 9A and FIG. 9B, the first voltage V1 (high voltage VH) and the second voltage V2 (low voltage VL) may be in the form of AC voltages. In FIG. 9A and FIG. 9B, "GND" refers to a ground voltage, to which the third electrode layer E3 is connected, for example; "VH" refers to a positive high voltage, during which the voltage level of the first electrode layer E1 is greater than that of the third electrode layer E3; "−VH" refers to a negative high voltage, during which the voltage level of the first electrode layer E1 is lower than that of the third electrode layer E3; "VL" refers to a positive low voltage, during which the voltage level of the second electrode layer E2 is higher than that of the third electrode layer E3; "−VL" refers to a negative low voltage, during which the voltage level of the second electrode layer E2 is lower than that of the third electrode layer E3. In some embodiments, |VH|≤50 V, and |VL|≤0.5*|VH|, but not limited thereto.

In some embodiments, as shown in FIG. 10A and FIG. 10B, a third voltage V3 is applied to the first electrode layer E1 and the second electrode layer E2 before the first voltage V1 (e.g., high voltage VH) is applied to the first electrode layer E1 and the second voltage V2 (e.g., low voltage VL) is applied to the second electrode layer E2. In some embodiments, the first voltage V1 (e.g., high voltage VH) is greater than the second voltage V2 (e.g., low voltage VL), the third voltage V3 is greater than the first voltage V1 and the second voltage V2, and the third voltage V3 is less than or equal to 2.5 times the first voltage V1. For example, the third voltage V3 is less than 1.5 times the first voltage V1, but not limited thereto. By applying a large voltage (the third voltage V3) to the first electrode layer E1 and the second electrode layer E2 before applying the first voltage V1 to the first electrode layer E1 and applying the second voltage V2 to the second electrode layer E2, the tilting of the first liquid crystal molecules LCM1 can be accelerated, which helps to increase the zoom speed.

In some embodiments, referring back to FIG. 4A, the first voltage V1 is also applied to the fourth electrode layer E4, and the second voltage V2 is also applied to the fifth electrode layer E5. The first voltage V1 is the absolute of the voltage difference between the fourth electrode layer E4 and the sixth electrode layer E6, and the second voltage V2 is the absolute of the voltage difference between the fifth electrode layer E5 and the sixth electrode layer E6. The method of applying voltages to these electrodes can be referred to the description of FIG. 9A through FIG. 10B, which will not be repeated here.

When the voltage difference (e.g., |V1−V2|) is applied to each of the first panel P1 and the second panel P2, the first liquid crystal molecules LCM1 and the second liquid crystal molecules LCM2 tilt according to the electric fields respectively across the first medium layer M1 and the second medium layer M2, and thus the diopter of the optical adjustable region R104 is changed.

By arranging the high-impedance film (e.g., the high-impedance film HIF1 and/or the high-impedance film HIF2) between the electrode layer and the medium layer (e.g., the second electrode layer E2 and the first medium layer M1 and/or the fifth electrode layer E5 and the second medium layer M2), the electric field variation near the boundary between the optical adjustable region R104 and the region R104' become a gradual variation from a steep variation, and the liquid crystal molecules (including the first liquid crystal molecules LCM1 and the second liquid crystal molecules LCM2) are gradually tilted near the boundary between the optical adjustable region R104 and the region R104' accordingly. In this way, the magnification of the image seen by the user near the boundary between the optical adjustable region R104 and the region R104' is gradually changed, so that better image quality can be provided.

Figure 11:
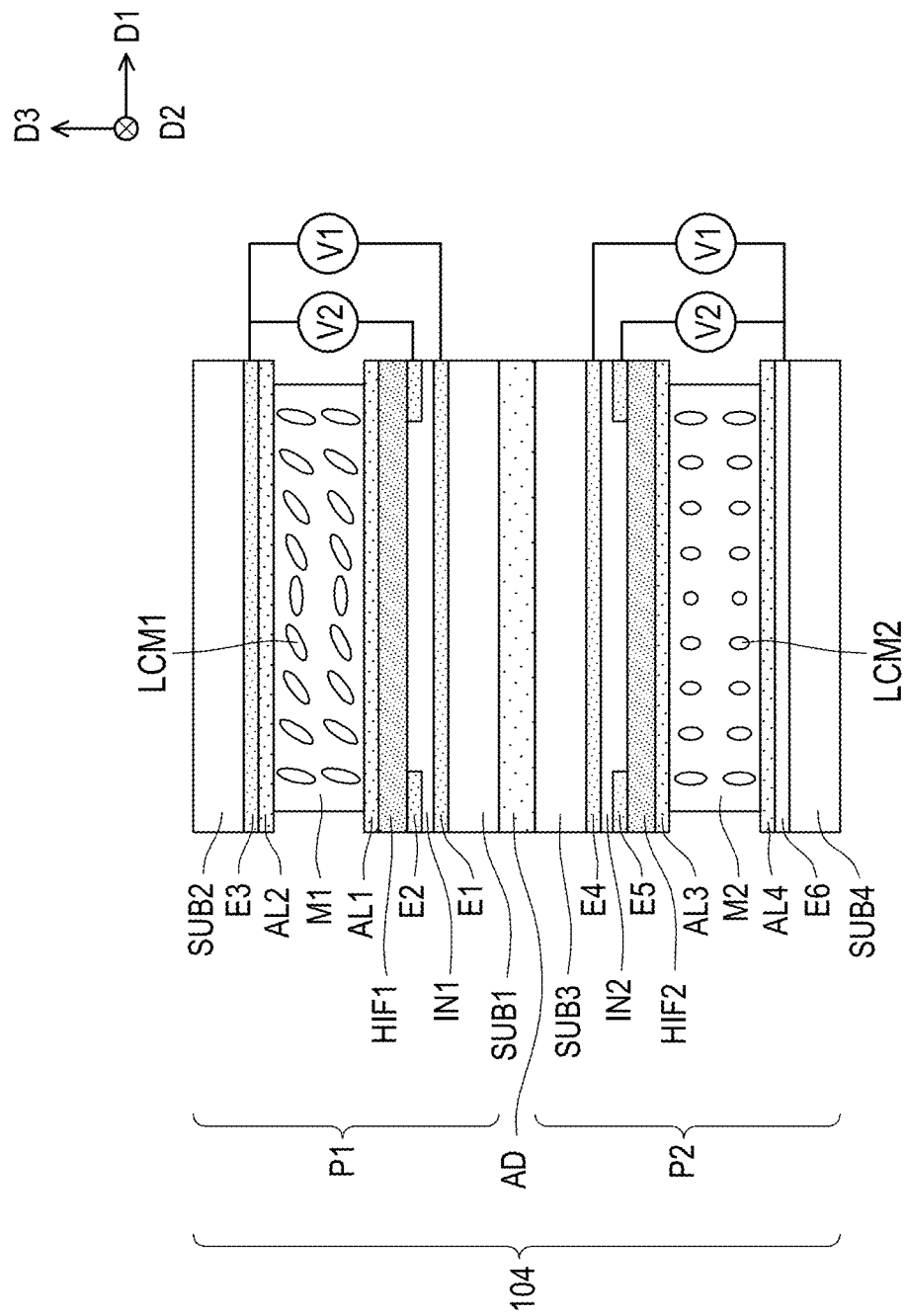
Figure 12:
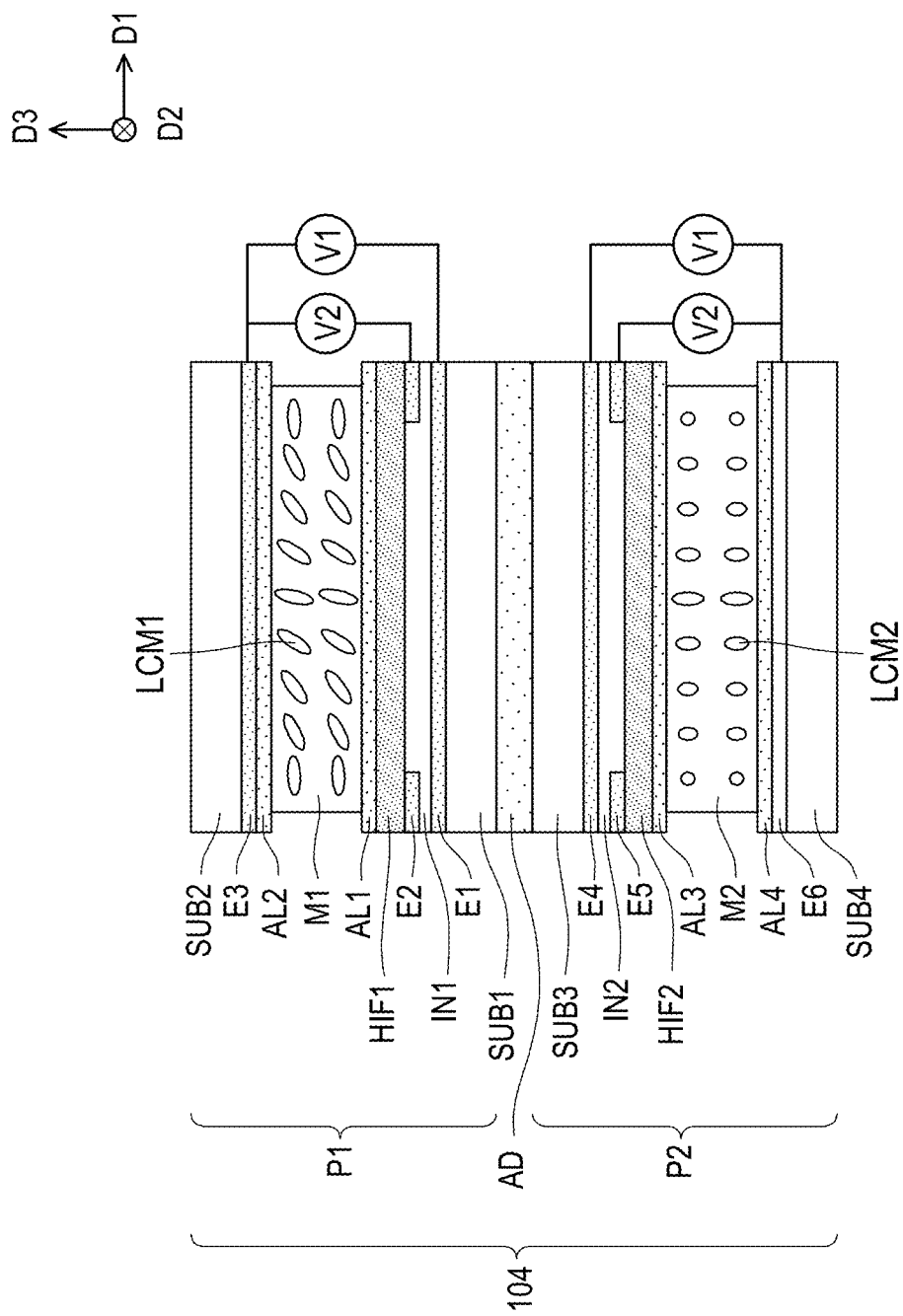

In some embodiments, as shown in FIG. 11, the optical adjustable region R104 of the panel assembly 104 serves as a convex lens when the first voltage V1 is smaller than the second voltage V2 (e.g., when the low voltage VL in FIG. 9B or FIG. 10B is served as the first voltage V1, and the high voltage VH in FIG. 9A or FIG. 10A is served as the second voltage V2). In some embodiments, as shown in FIG. 12, the optical adjustable region R104 of the panel assembly 104 serves as a concave lens when the first voltage V1 is larger than the second voltage V2 (e.g., when the high voltage VH in FIG. 9A or FIG. 10A is served as the first voltage V1, and the low voltage VL in FIG. 9B or FIG. 10B is served as the second voltage V2), but not limited thereto. By adjusting the applied voltages (e.g., the first voltage V1 and/or the second voltage V2) or the voltage difference (e.g., |V1−V2|), different electric fields can be generated, and thus different focal distances of the optical adjustable region R104 can be generated. For example, the focal distance of the optical adjustable region R104 can be switched between far, medium and near sides, and the electronic device using the panel assembly 104 may provide continuous zoom function accordingly. Moreover, the combination of the panel assembly 104 and the general lens(s) (e.g., the front lens 100 and the rear lens 102 shown in FIG. 3A or the les 106 shown in FIG. 3B or FIG. 3C) helps to improve the problem of the apparent visibility of the Fresnel optical adjustment structure, and thus the display quality can be improved. By changing the voltage difference between the first electrode layer E1 and the second electrode layer E2, the tilting angle of the first liquid crystal molecules LCM1 can be changed, so that the refractive index of the first panel P1 can be changed correspondingly, and thus achieving the dimming effect.

In FIG. 4A, the first panel P1 and the second panel P2 presenting a mirror-symmetrical structure with the adhesive layer AD as the axis of symmetry is illustrated for exemplary explanation purpose. However, in some embodiments, at least one of the first panel P1 and the second panel P2 may be arranged upside down, and/or positions of the first panel P1 and the second panel P2 can be switched. The following embodiments can be changed accordingly, and will not be repeated below.

In FIG. 4A, the first electrode layer E1 and the fourth electrode layer E4 applied with the same voltage (e.g., the first voltage V1) and the second electrode layer E2 and the fifth electrode layer E5 applied with the same voltage (e.g., the second voltage V2) are illustrated for exemplary explanation purpose. However, the voltage applied to the first electrode layer E1 may be different from the voltage applied to the fourth electrode layer E4, and the voltage applied to the second electrode layer E2 may be different from the voltage applied to the fifth electrode layer E5, while the voltage difference applied to the first panel P1 and the second panel P2 may be the same. However, deviations may exist in voltage differences between different panels due to process variation. The following embodiments can be changed accordingly, and will not be repeated below.

In FIG. 4A, two panels (the first panel P1 and the second panel P2) are illustrated for exemplary explanation purpose. However, the number of the panels in the panel assembly 104 may be changed according to needs. For example, the number of the panels in the panel assembly 104 may be increased to increase the zoom range. As exemplary explanation, if the zoom range of the two panels is 0 degrees to 50 degrees, the zoom range of the four panels is 0 degrees to 100 degrees, and so on. Although not shown, the electronic device may include a plurality of the first panels and a plurality of the second panels overlapped with the plurality of first panels. The plurality of first panels and the plurality of the second panels may be alternately arranged along the direction D3, but not limited thereto. The details of the signal supply of the plurality of first panels P1 and the plurality of second panels P2 can be referred to above, and will not be repeated here.

In some embodiments, cell gaps (e.g., a cell gap CG1 and a cell gap CG2) of the panels may be increased to increase the zoom range. For example, the cell gaps can be increased by 1.5, 2, 3 times, etc., so that the zoom range can be increased by 1.5, 2, 3 times, etc., but not limited thereto.

In some embodiments, as shown in FIG. 5A, the first panel P1 further includes a sealant SL1 that surrounds the first medium layer M1 and an adhesive layer AD1 that surrounds the sealant SL1. The material of the adhesive layer AD1 may refer to the material of the adhesive layer AD, and will not be repeated here. Similarly, the second panel P2 may further include a sealant SL2 that surrounds the second medium layer M2 and an adhesive layer AD2 that surrounds the sealant SL2. The material of the adhesive layer AD2 may refer to the material of the adhesive layer AD, and will not be repeated here.

Figure 6:
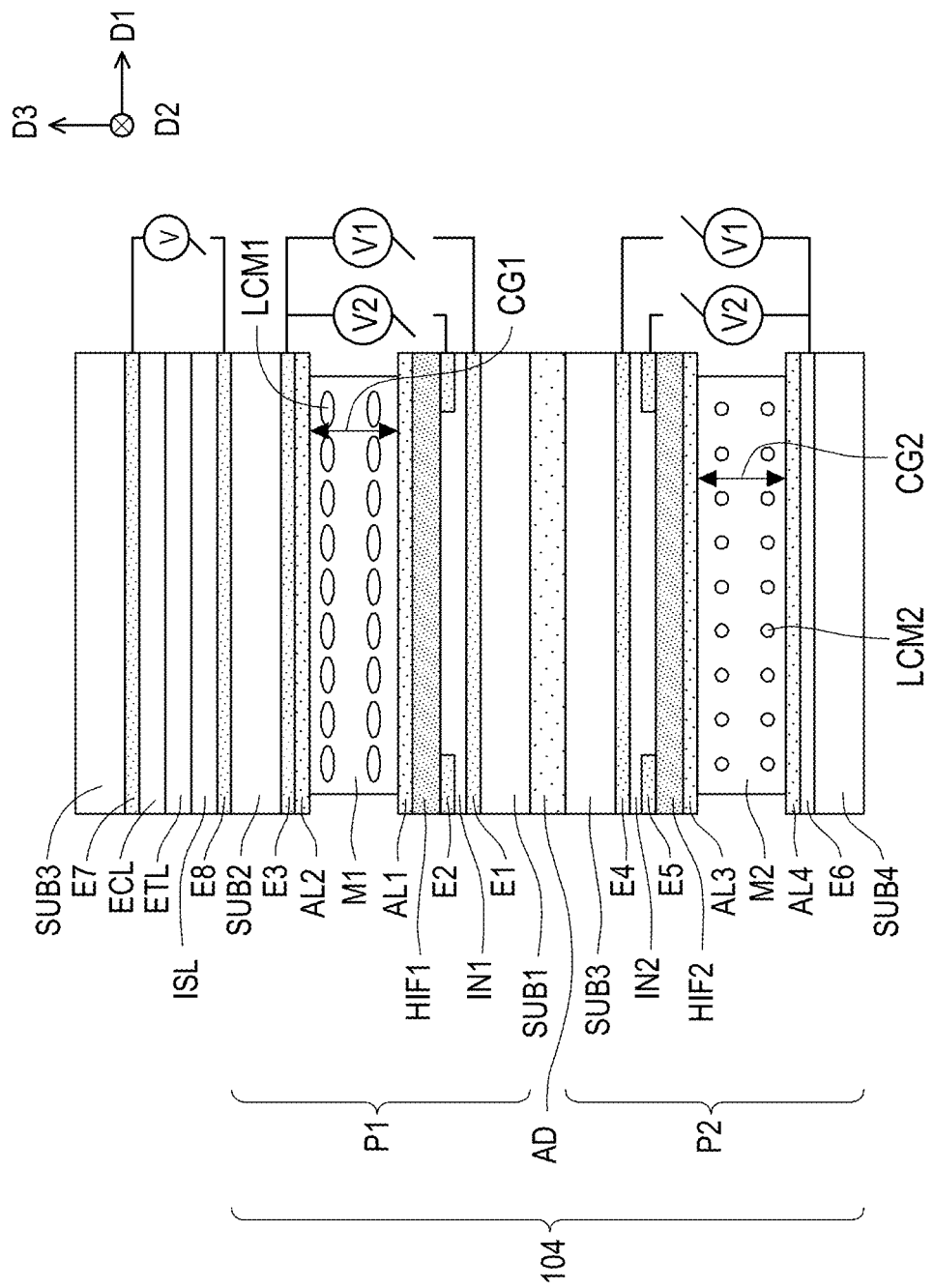

In some embodiments, as shown in FIG. 6, the electronic device further includes an electrochromic layer ECL to provide sunglasses function. The first panel P1 may be disposed between the electrochromic layer EL and the second panel P2. However, the arrangement relationship between the electrochromic layer ECL, the first panel P1 and the second panel P2 may be changed according to needs. For example, the second panel P2 may be disposed between the electrochromic layer ECL and the first panel P1, but not limited thereto.

In some embodiments, as shown in FIG. 6, the electronic device further includes a substrate SUB3, a seventh electrode layer E7, an electrolyte layer ETL, an ion storage layer ISL and an eighth electrode layer E8, but not limited thereto. For example, the electronic device may further include a substrate (not shown; e.g., a fourth substrate) between the eighth electrode layer E8 and the substrate SUB2, but not limited thereto.

The substrate SUB3 and the fourth substrate (if existed) are overlapped with the substrate SUB1 along the direction D3. Materials of the substrate SUB3 and the fourth substrate may refer to the material of the substrate SUB1, which will not be repeated here.

The seventh electrode layer E7 is disposed between the electrochromic layer ECL and the substrate SUB3. The seventh electrode layer E7 may be a non-patterned transparent conductive layer. Transparent conductive material may include metal oxide (e.g., indium tin oxide), carbon nanotube, graphene, other suitable materials, or a combination thereof, but not limited to.

The electrochromic layer ECL is disposed between the electrolyte layer ETL and the seventh electrode layer E7, the electrolyte layer ETL is disposed between the electrochromic layer ECL and the ion storage layer ISL, and the eighth electrode layer E8 is disposed between the ion storage layer ISL and the substrate SUB2. The eighth electrode layer E8 may be a non-patterned transparent conductive layer. Transparent conductive material may include metal oxide (e.g., indium tin oxide), carbon nanotube, graphene, other suitable materials, or a combination thereof, but not limited to.

When a voltage V is applied to the eighth electrode layer E8, the electrochromic layer ECL is switched from a transparent state to a colored state (e.g., a dark state). On the other hand, when no voltage is applied to the eighth electrode layer E8, the electrochromic layer ECL is switched from the colored state back to the transparent state. The voltage V refers to the absolute of the voltage difference between the seventh electrode layer E7 and the eighth electrode layer E8.

The electronic device of any embodiment of the present disclosure can provide sunglasses function by disposing the electrochromic layer ECL and/or other layers (e.g., the substrate SUB3, the seventh electrode layer E7, the electrolyte layer ETL, the ion storage layer ISL, the eighth electrode layer E8 and/or the fourth substrate) described in FIG. 6, which will not be repeated below.

Figure 7:
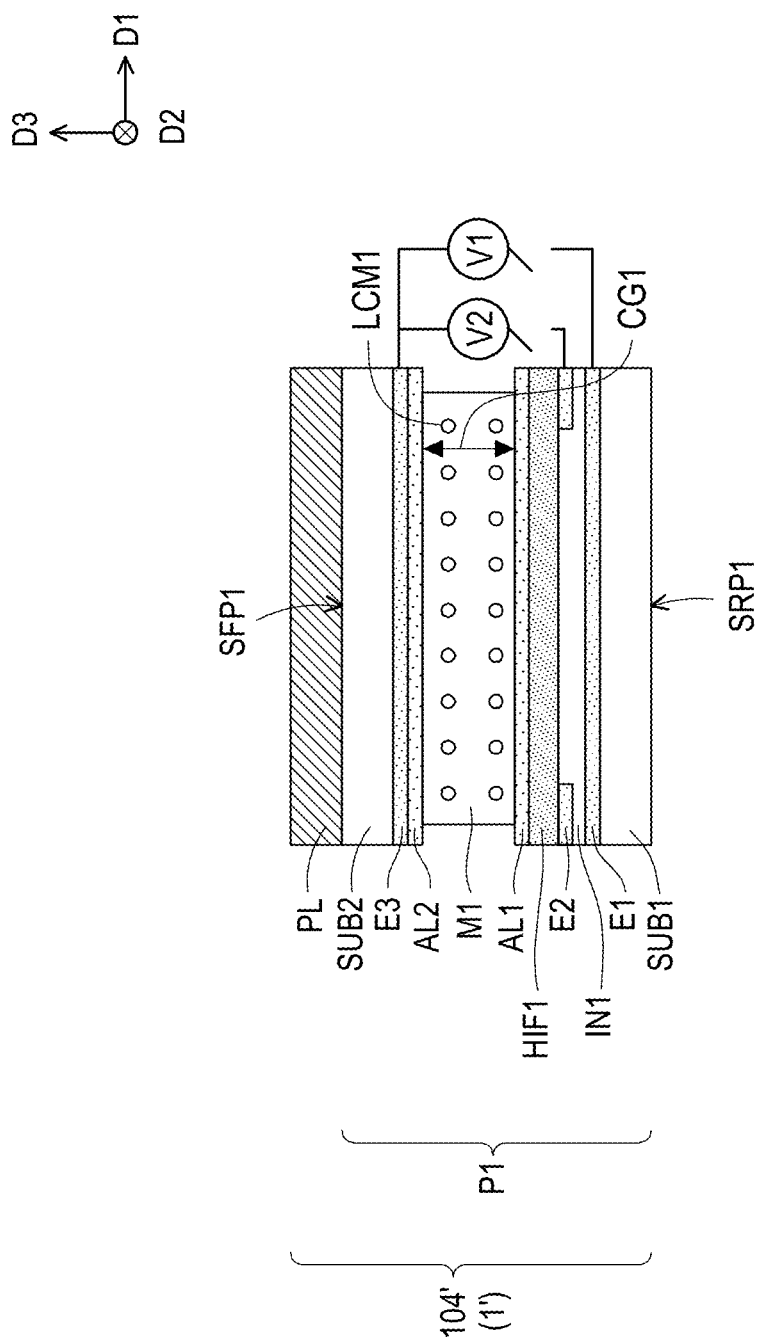

In some embodiments, as shown in FIG. 7, a panel assembly 104' of an electronic device 1' includes only one panel (e.g., the first panel P1) and a polarizer PL overlapped with the first panel P1. The polarizer PL may be attached to a front surface SFP1 or a rear surface SRP1 of the first panel P1 through an adhesive layer (not shown) or other fixing mechanisms (not shown). The polarizer PL is, for example, an absorptive polarizer, but not limited to. The second panel P2 described above can be omitted by filtering (e.g., absorbing) the light whose polarization direction is perpendicular to the first alignment direction through the polarizer PL.

In other embodiments not shown, the electronic device 1' further includes a plano-concave lens (e.g., the front lens 100 shown in FIG. 3A) and a plano-convex lens (e.g., the rear lens 102 shown in FIG. 3A), wherein the first panel P1 and the polarizer PL are disposed between the plano-concave lens and the plano-convex lens. Alternatively, the electronic device 1' may further include the lens 106 shown in FIG. 3B or FIG. 3C, and the panel assembly 104' may be attached to the front surface SF106 or the rear surface SR106 of the lens 106. In some embodiments, the polarizer PL can be positioned on the front surface or the rear surface of the plano-concave lens, or the front surface or the rear surface of the plano-convex lens, but not limited to.

In other embodiments not shown, the first panel P1 of the electronic device 1' further includes the sealant SL1 and the adhesive layer AD1 shown in FIG. 5A. In other embodiments not shown, the electronic device 1' further includes the electrochromic layer ECL (shown in FIG. 6) overlapped with the first panel P1 and the polarizer PL to provide sunglasses function. In other embodiments not shown, the electronic device 1' includes a plurality of the first panels P1 overlapped with each other along the direction D3 to increase the zoom range. In other embodiments not shown, the cell gap CG1 of the first panel P1 may be increased to increase the zoom range.

Figure 8A:
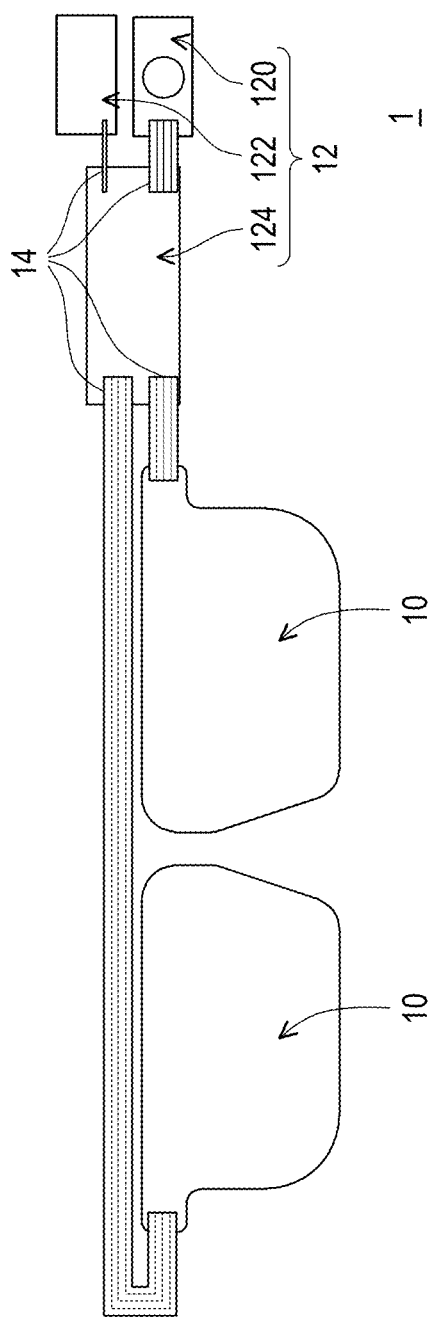

In some embodiments, as shown in FIG. 8A, the electronic device 1 (or the electronic device 1' I FIG. 7) includes one circuit module 12 and a plurality of signal connection elements (e.g., FPC, trigger lines or combination thereof) 14. In some embodiments, the circuit module 12 includes a touch sensor 120, a power supply unit (e.g., a battery) 122 and a circuit board 124, but not limited to. The touch sensor 120 is electrically connected to the circuit board 124 through at least one of the plurality of signal connection elements 14. The power supply unit 122 is electrically connected to the circuit board 124 through at least one of the plurality of signal connection elements 14. Each of the optical adjustment structure 10 is electrically connected to the circuit board 124 through at least one of the plurality of signal connection elements 14. In some embodiments, the plurality of signal connection elements 14 are disposed in different parts (e.g., the temples T and/or rims R shown in FIG. 1) of the glasses. The panel assembly in the optical adjustment structure 10 can be driven by touching the touch sensor 120, and the touch sensor 120 can adjust different diopters in segments. In FIG. 8A, the circuit module 12 on the left eye side of the glasses is illustrated for exemplary explanation purpose. However, the relative disposition between the optical adjustment structure 10 and the circuit module 12 may be changed according to needs. For example, the circuit module 12 may be on the right eye side of the glasses, but not limited to.

Figure 8B:
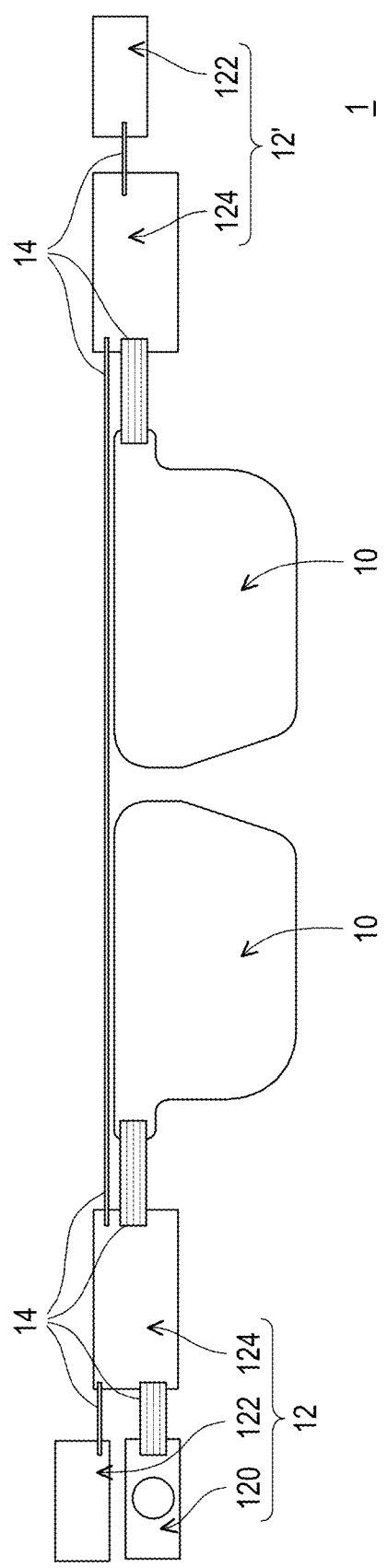

In some embodiments, as shown in FIG. 8B, the electronic device 1 (or the electronic device 1'I FIG. 7) includes two circuit modules (e.g., the circuit module 12 and a circuit module 12') and a plurality of signal connection elements 14. The circuit module 12 is, for example, on the right eye side of the glasses and electrically connected to the panel assembly in optical adjustment structure 10 on the right eye side of the glasses. The circuit module 12' is, for example, on the left eye side of the glasses and electrically connected to the panel assembly in optical adjustment structure 10 on the left eye side of the glasses. The circuit module 12' may include the power supply unit 122 and the circuit board 124. The circuit board 124 of the circuit module 12 and the circuit board 124 of the circuit module 12' are electrically connected through at least one of the plurality of signal connection elements 14. The circuit board 124 of the circuit module 12 may be a main circuit board, and the circuit board 124 of the circuit module 12' may be an auxiliary circuit board. After touching the touch sensor 120, the driving circuits (not shown) in the main and auxiliary circuit boards can be triggered at the same time, and the touch sensor 120 can adjust different diopters in segments. In other embodiments not shown, positions of the main circuit board and the auxiliary circuit board may be interchanged.

Figure 8C:
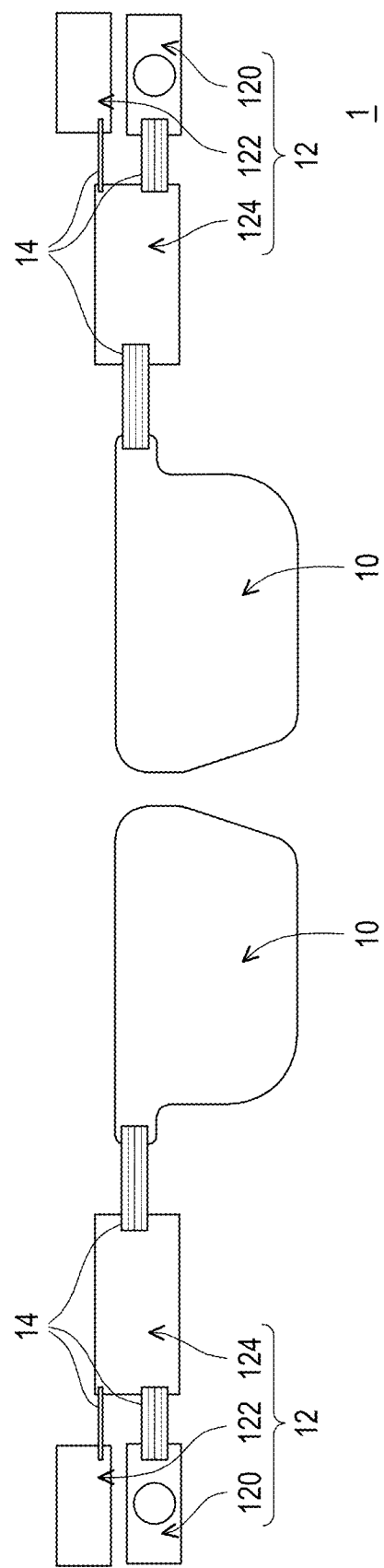

In some embodiments, as shown in FIG. 8C, the electronic device 1 (or the electronic device 1' I FIG. 7) includes two circuit modules 12 and a plurality of signal connection elements 14. In this way, the optical adjustment structure 10 can be individually controlled. Specifically, the panel assembly in the optical adjustment structure 10 on the right eye side of the glasses can be driven by touching the touch sensor 120 on the right eye side of the glasses, and the panel assembly in the optical adjustment structure 10 on the left eye side of the glasses can be driven by touching the touch sensor 120 on the left eye side of the glasses.

To sum up, in the embodiments of the disclosure, by adjusting the applied voltages (e.g., the first voltage V1 and/or the second voltage V2) or the voltage difference (e.g., |V1−V2|), different electric fields can be generated, and thus different focal distances can be generated, and the electronic device may provide continuous zoom function accordingly. In some embodiments, the problem of the apparent visibility of the Fresnel optical adjustment structure can be improved by using general lens(es) in combination of a panel assembly, and thus the display quality can be improved accordingly.

The foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

Although the embodiments of the disclosure and the advantages thereof have been disclosed above, it should be understood that any person with ordinary skill in the art may make changes, substitutions, and modifications without departing from the spirit and scope of the disclosure, and the features of the various embodiments may be arbitrarily mixed and replaced with one another to form other new embodiments. In addition, the protection scope of the disclosure is not limited to the processes, machines, manufactures, compositions of the matter, devices, methods, and steps in the specific embodiments described in the specification. It is understood that processes, machines, manufactures, compositions of matter, devices, methods, and steps developed in the present or in the future may be used in accordance with the disclosure as long as they may implement substantially the same functions or achieve substantially the same results in the embodiments described herein. Therefore, the protection scope of the disclosure includes the above-mentioned processes, machines, manufactures, compositions of matter, devices, methods, and steps. In addition, each of the claims constitutes a separate embodiment, and the protection scope of the disclosure also includes each of the combinations of the claims and the embodiments. The protection scope of the disclosure shall be determined by the appended patent claims.

What is claimed is:

1. An operation method of electronic device, comprising:
providing a first panel, wherein the first panel comprises:
a first substrate;
a first medium layer disposed on the first substrate;
a first electrode layer disposed between the first substrate and the first medium layer; and
a second electrode layer disposed between the first electrode layer and the first medium layer;
providing a second panel overlapped with the first panel,
providing an adhesive layer, wherein the first panel is attached to the second panel through the adhesive layer, and the first panel and the second panel present a mirror-symmetrical structure with the adhesive layer as the axis of symmetry;
applying a first voltage to the first electrode layer;
applying a second voltage to the second electrode layer, wherein the first voltage is different from the second voltage; and
applying a third voltage to the first electrode layer and the second electrode layer before the first voltage is applied to the first electrode layer and the second voltage is applied to the second electrode layer.

2. The operation method of electronic device according to claim 1, wherein the second panel comprises a second medium layer, and wherein the first medium layer comprises first liquid crystal molecules with a first alignment direction, the second medium layer comprises second liquid crystal molecules with a second alignment direction different from the first alignment direction.

3. The operation method of electronic device according to claim 2, wherein the first alignment direction is perpendicular to the second alignment direction, and the electronic device is polarizer-free.

4. The operation method of electronic device according to claim 1, wherein the first panel further comprises:
an alignment film disposed between the second electrode layer and the first medium layer; and
a high-impedance film disposed between the alignment film and the second electrode layer,
wherein a surface impedance of the high-impedance film is $10^5$ Ω/square to $10^{10}$ Ω/square.

5. The operation method of electronic device according to claim 4, wherein a material of the high-impedance film comprises conductive polymer, transparent conductive oxide, metal, carbon nanotube, graphene, or a combination thereof.

6. The operation method of electronic device according to claim 1, wherein the electronic device comprises a plurality of the first panels and a plurality of the second panels overlapped with the plurality of first panels.

7. The operation method of electronic device according to claim 1, further comprising:
a plano-concave lens and a plano-convex lens, wherein the first panel and the second panel are disposed between the plano-concave lens and the plano-convex lens.

8. The operation method of electronic device according to claim 1, further comprising:
an electrochromic layer, wherein the first panel is disposed between the electrochromic layer and the second panel.

9. The operation method of electronic device according to claim 1, wherein the first voltage is greater than the second voltage.

10. The operation method of electronic device according to claim 1, wherein the third voltage is greater than the first voltage and the second voltage.

11. The operation method of electronic device according to claim 10, wherein the third voltage is less than or equal to 2.5 times the first voltage.

12. The operation method of electronic device according to claim 10, wherein the third voltage is less than or equal to 1.5 times the first voltage.

13. The operation method of electronic device according to claim 12, wherein the second panel comprises:
a second substrate;
a second medium layer disposed on the second substrate;
a third electrode layer disposed between the second substrate and the second medium layer; and
a fourth electrode layer disposed between the third electrode layer and the second medium layer,
wherein the first voltage applied to the first electrode layer is different from a fourth voltage applied to the third electrode layer.

14. The operation method of electronic device according to claim 13, wherein the second voltage applied to the second electrode layer is different from a fifth voltage applied to the fourth electrode layer.

15. The operation method of electronic device according to claim 14, wherein a voltage difference between the first electrode layer and the second electrode layer is equal to a voltage difference between the third electrode layer and the fourth electrode layer.

16. The operation method of electronic device according to claim 13, wherein the first medium layer comprises first liquid crystal molecules with a first alignment direction, the second medium layer comprises second liquid crystal molecules with a second alignment direction different from the first alignment direction.

17. The operation method of electronic device according to claim 16, wherein the first alignment direction is perpendicular to the second alignment direction, and the electronic device is polarizer-free.

* * * * *